(12) United States Patent
Kim

(10) Patent No.: US 6,882,726 B2
(45) Date of Patent: Apr. 19, 2005

(54) APPARATUS FOR MOUNTING A ROTATIONAL LENS HOUSING IN A FOLDER-TYPE TELEPHONE

(75) Inventor: Yong-Jae Kim, Suwon (JP)

(73) Assignee: Samsung Electronics Co., Ltd. (KR)

( * ) Notice: Subject to any disclaimer, the term of this patent is extended or adjusted under 35 U.S.C. 154(b) by 400 days.

(21) Appl. No.: 10/234,782

(22) Filed: Sep. 4, 2002

(65) Prior Publication Data

US 2003/0044001 A1 Mar. 6, 2003

(30) Foreign Application Priority Data

Sep. 6, 2001 (KR) ........................................ P2001-54881

(51) Int. Cl.$^7$ .............................................. H04M 1/00
(52) U.S. Cl. .................................................. 379/433.13
(58) Field of Search ........................ 379/433.13, 433.01; 455/90.3, 575.1; 348/14.02

(56) References Cited

U.S. PATENT DOCUMENTS 6,069,648 A * 5/2000 Suso et al. ................. 348/14.02
6,396,924 B1 * 5/2002 Suso et al. ............. 379/433.13

* cited by examiner

*Primary Examiner*—Jack Chiang
(74) *Attorney, Agent, or Firm*—Dilworth & Barrese LLP

(57) ABSTRACT

An apparatus for mounting a rotational lens housing and a folder-type telephone therewith are provided. The apparatus for mounting a camera lens housing of a telephone including a body housing, a folder, and a hinge for rotatably connecting the body housing to the folder includes a hinge arm arranged in a direction of one side hinge axis of the body housing, a lens housing with a camera lens assembly, a connector, around which a flexible printed circuit board (FPCB) of the camera lens assembly is wound at least once and through which the FPCB passes so that the FPCB of the camera lens assembly is connected to a main printed circuit board (PCB), the connector for rotatably confining the lens housing to the hinge arm within a predetermined angle, and a latch for confining the lens housing and the connector in a direction of a hinge axis.

15 Claims, 5 Drawing Sheets

APPARATUS FOR MOUNTING A ROTATIONAL LENS HOUSING IN A FOLDER-TYPE TELEPHONE

PRIORITY

This application claims priority to an application entitled "Apparatus for Mounting a Rotational Lens Housing and a Folder-Type Telephone Therewith" filed in the Korean Industrial Property Office on Sep. 6, 2001 and assigned Serial No. 2001-54881, the contents of which are hereby incorporated by reference.

BACKGROUND OF THE INVENTION

1. Field of the Invention

The present invention relates generally to folder-type portable telephones, and in particular, to a folder-type portable telephone having a rotational lens housing mounting apparatus.

2. Description of the Related Art

In general, a portable telephone may be classified according to its appearance. This may include, for example, a bar-type, a flip-type, and a folder-type portable telephones. Portable telephones may also be classified in accordance with the method in which they are worn, including, for example, neck wearable types and wrist wearable types. Portable telephones may also be classified according to their functionality such as, audio, video and Internet functionality.

Presently, in order to perform audio and video functions of a portable telephone, a conventional camera lens assembly must be mounted or attached in some manner to the portable telephone. A conventional camera lens assembly typically includes a camera lens, a charge coupled device (CCD), and associated circuitry for transmitting signals from the CCD. By way of example, in a conventional folder-type portable telephone, a camera lens assembly may be mounted on top of a body housing or folder of the telephone. In bar-type and flip-type telephones, the camera lens assembly is mounted on top of a main body of the telephone. Also, in notebook computers and personal digital assistants (PDAS), the camera lens assembly is mounted in an appropriate place. For each of the aforementioned mounting configurations, a conventional camera lens assembly is generally mounted in a predetermined fixed orientation relative to a fixed body, such as, for example, the main body of the portable telephone. This may be inconvenient to the user of the telephone device in that when a user performs video communication functions of the device, the user must awkwardly adjust his or position to accommodate the fixed position of the lens face. Furthermore, in order to take pictures, the user must awkwardly orient himself in an uncomfortable position.

Another drawback of the aforementioned prior art configurations is that in the case where the portable telephone with the camera lens assembly is inadvertently dropped, the camera lens assembly is easily damaged. Damage to the camera lens assembly will result in most instances by virtue of the external mounting configurations described above. That is, the conventional camera lens assembly is generally mounted so that it protrudes above the main body. As such, the camera lens is always exposed and damage can easily occur when dropped.

It would therefore be desirable to provide a portable telephone apparatus, which allows a user to easily perform audio and video communication functions while avoiding the aforementioned drawbacks of the prior art.

SUMMARY OF THE INVENTION

It is, therefore, an object of the present invention to provide a rotational lens housing mounting apparatus for use in a folder-type telephone, which is capable of allowing a user to easily perform video communication functions.

It is another object of the present invention to provide a rotational lens housing mounting apparatus for use in a folder-type telephone, where a flexible printed circuit board (FPCB) is not twisted while performing video functions.

It is a further object of the present invention to provide a rotational lens housing mounting apparatus for use in a folder-type telephone, which is capable of performing video picture taking functions irrespective of the orientation of the folder-type telephone.

To achieve the above and other objects, there is provided a rotational lens housing mounting apparatus for mounting a camera lens housing to a folder-type telephone, the folder-type telephone including a body housing, a flip-type folder, and hinge means for rotatably connecting the body housing to the folder.

The rotational lens housing mounting apparatus of the folder-type telephone includes:

a hinge arm arranged in a direction of one side hinge axis of a body housing of the folder-type telephone;

a lens housing encasing a camera lens assembly;

a connector, around which a flexible printed circuit board (FPCB) of the camera lens assembly is wound and through which the FPCB passes for connecting the FPCB of the camera lens assembly to a main printed circuit board (PCB), the connector further rotatably confines the lens housing to the hinge arm within a predetermined angle and latch means for confining the lens housing and the connector in a direction of a hinge axis.

The present invention provides a folder type telephone including a body housing integrated with first and second side hinge arms; a folder integrated with a center hinge arm arranged between the first and second side hinge arms; a rotational lens housing provided to face the second side hinge are; a connector, around which a flexible printed circuit board (FCPB) protrudes from the lens housing and is wound at least once around the lens housing and through which the FCPB passes such that the FPBC is connected to a main printed circuit board (PCB). The rotational lens housing also having a locking member extended in an outer circumferential direction, the locking member for confining the lens housing to the second side hinge arm. The connector rotatably confining the rotational lens housing to the second side hinge arm within a predetermined angle; first and second openings extended to the lens housing and the second side hinge arm along outer circumferential directions so that the FPCB passes through the first and second openings; and a latch means for confining the lens housing and the connector in a direction of a hinge axis.

The present invention provides a folder type telephone including a body housing integrated with first and second side hinge arms; a folder integrated with a center hinge arm arranged between the first and second side hinge arms; a rotational lens housing provided to face the second side hinge arm; a connector, around which a flexible printed circuit board (FCPB) protrudes from the lens housing and is wound at least once around the lens housing and through which the FCPB passes such that the FPCB is connected to a main printed circuit board (PCB). The rotational lens housing also having a locking member extended in an outer circumferential direction, the locking member for confining the lens housing to the second side hinge arm. The connector rotatably confining the rotational lens housing to the second side hinge arm within a predetermined angle; first and second openings; and a latch means for confining the lens housing and the connector in a direction of a hinge axis.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
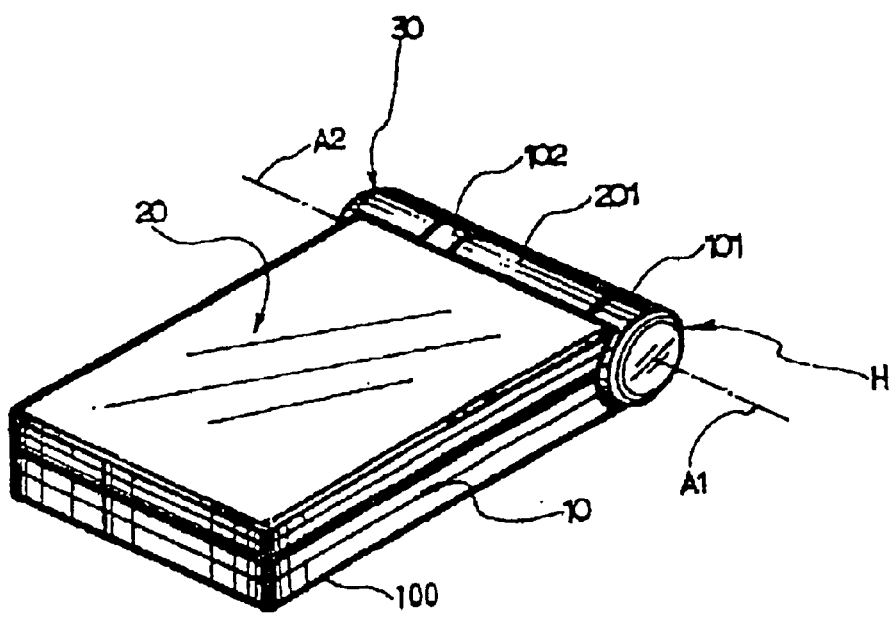
FIG. 1 is a perspective view of an embodiment of the present invention showing a folder-type telephone in a closed state wherein the camera lens assembly mounted on a lens housing folded toward the body housing.
Figure 2:
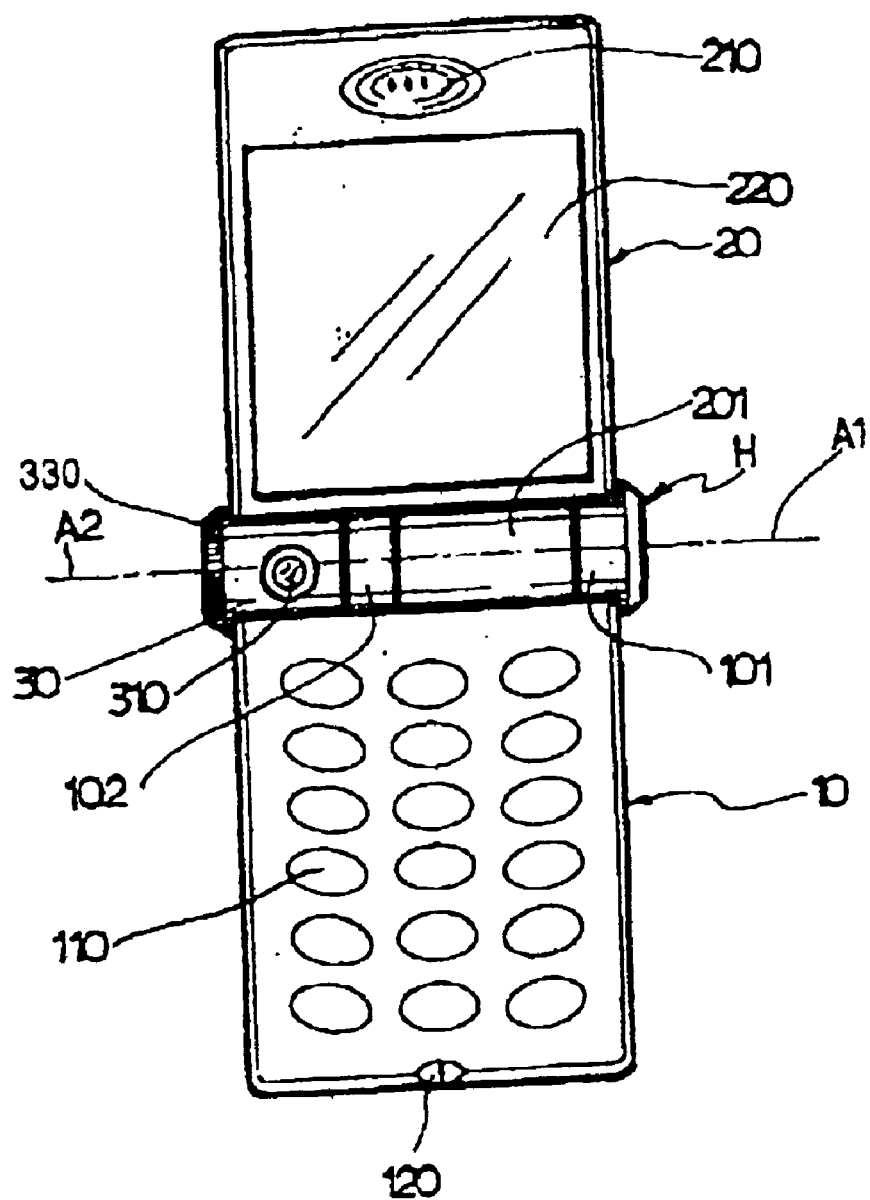
FIG. 2 is a plan view showing a folder-type telephone in an opened state wherein the camera lens assembly mounted on the lens housing unfolded from the body housing.

FIG. 1 is a perspective view showing a folder-type telephone 100 with a rotational lens housing 30 according to the present invention, wherein a folder 20 is folded toward a body housing 10. FIG. 2 is a plan view showing the folder-type telephone 100 of FIG. 1 with the rotational lens housing 30, wherein the folder 20 is completely unfolded from the body housing 10.

As shown in FIGS. 1 and 2, the folder-type telephone includes a body housing 10, a folder 20, hinge means H for rotatably connecting the body housing 10 to the folder 20, and a rotational lens housing 30 on which a camera lens assembly is mounted. The axis of the rotational lens housing 30 is along the same hinge axis A1 and is rotatable around a rotation axis A2 within a predetermined angle. It is noted that hinge axis A1 and rotation axis A2 are coaxial.

With continued reference to FIG. 2, the body housing 10 of the folder-type telephone 100 further includes a plurality of keys 110 for inputting desired data by a pressing operation and a microphone 120. The folder 20 includes a liquid crystal display (LCD) 220 for displaying input data and an earpiece 210. The keys 110 include character keys, number keys, a SEND key, a DELETE key, an END key, and special keys. The earpiece 210 includes a speaker (not shown). The display 220, earpiece 210 and keys 110 are well known and as such will not be described further.

The folder 20 is foldable to and from the body housing 10 about hinge axis A1. The hinge means H includes first and second side hinge arms 101 and 102 integral with the body housing 10. Side hinge arms 101 and 102 are located on opposite sides of the body housing 10 and are separated by, a center hinge arm 201, adjacent to the second side hinge arm 102 and rotatably connected thereto. The center hinge arm 201, the first and second side hinge arms 101 and 102, and the lens housing 30 are rotatably connected to each other centering around the hinge axis A1. As such, the lens housing 30 performs the hinge function along with the center hinge arm 201 and the first and second side hinge arms 101 and 102. The lens housing 30, the first and second side hinge arms 101 and 102, and the center hinge arm 201 are hollow and cylindrical. Also shown is a rotation handle 330, at one end of the lens housing 30 so that a rotation operation can be easily performed.

It is noted that the lens housing mounting apparatus allows the lens housing 30 to assume a number of states to be defined.

In a closed state, the folder-type telephone 100 is not being used. This occurs, for example, where the folder-type telephone is being carried by a user (as shown in FIG. 1). In the closed state, the camera lens 310 is rotated in the lens housing 30 such that it is rotated towards the body housing and is therefore hidden therein. This is advantageous in that it protects the camera lens 310 from damage when the telephone 100 is being transported.

In a video communication state, a user wishes to speak with another user while simultaneously utilizing the video capability of the telephone 100. In this state, the user faces the camera lens 310 while performing the video communication function and rotates the lens housing 30 at an angle where the user can optimally face the camera lens 310 of the lens housing 30.

In a picture taking state, the user desires to take pictures. In this state, the user can control the angle at which the camera lens 310 faces the subject.

An apparatus for mounting the lens housing 30 according to the present invention will now be described in detail with reference to FIGS. 3–5 and 7. As illustrated in FIGS. 3–5 and 7, the rotational lens housing mounting apparatus according to the present invention includes the lens housing 30, the second side hinge arm 102 of the body housing, and a connector 40 for rotatably confining the lens housing 30 to the second side hinge arm 102 (See FIG. 1). The mounting apparatus 300 according to the present invention further includes a latch means S for latching the connector 40 for connecting the lens housing 30 to the second side hinge arm 102 such that the lens housing 30 is confined to the side hinge arm 102. An elastic substance 320, described below, is added between the lens housing 30 and the connector 40 so as to maintain both the rotary operation and the stationary state of the lens housing 30.

Figure 5:
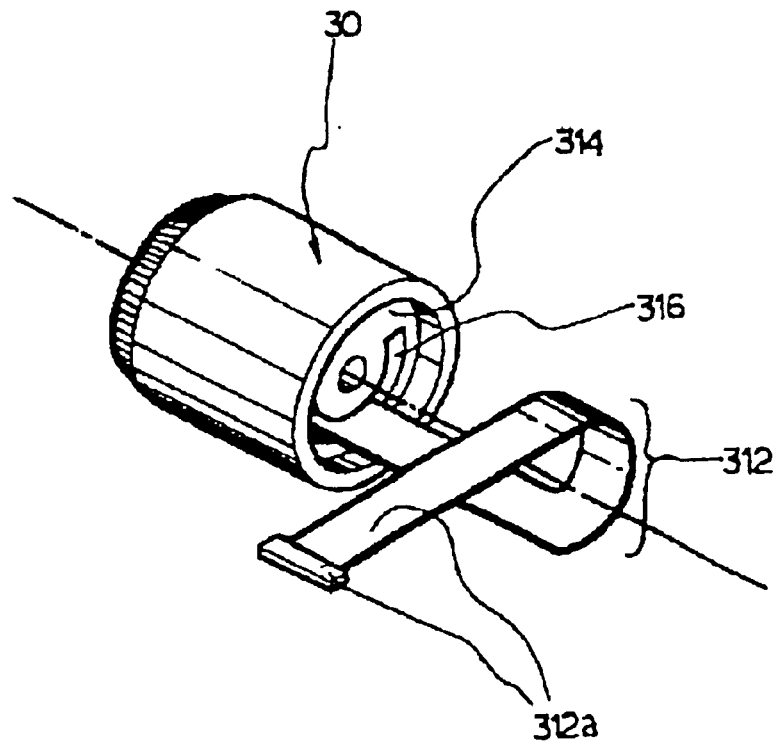
FIG. 5 is a perspective view showing the wound state of a flexible printed circuit board (FPCB) protruding from the lens housing.

In FIG. 5, the lens housing 30 is illustrated including a concave recess 314 on one side of the lens housing 30 so that the elastic substance 320 can be received or mounted. The side of the lens housing 30 where the recess 314 is formed faces the second side hinge arm 102. The recess 314 of the lens housing forms an opening 316, through which a flexible printed circuit board (FPCB) 312 protrudes.

Figure 3:
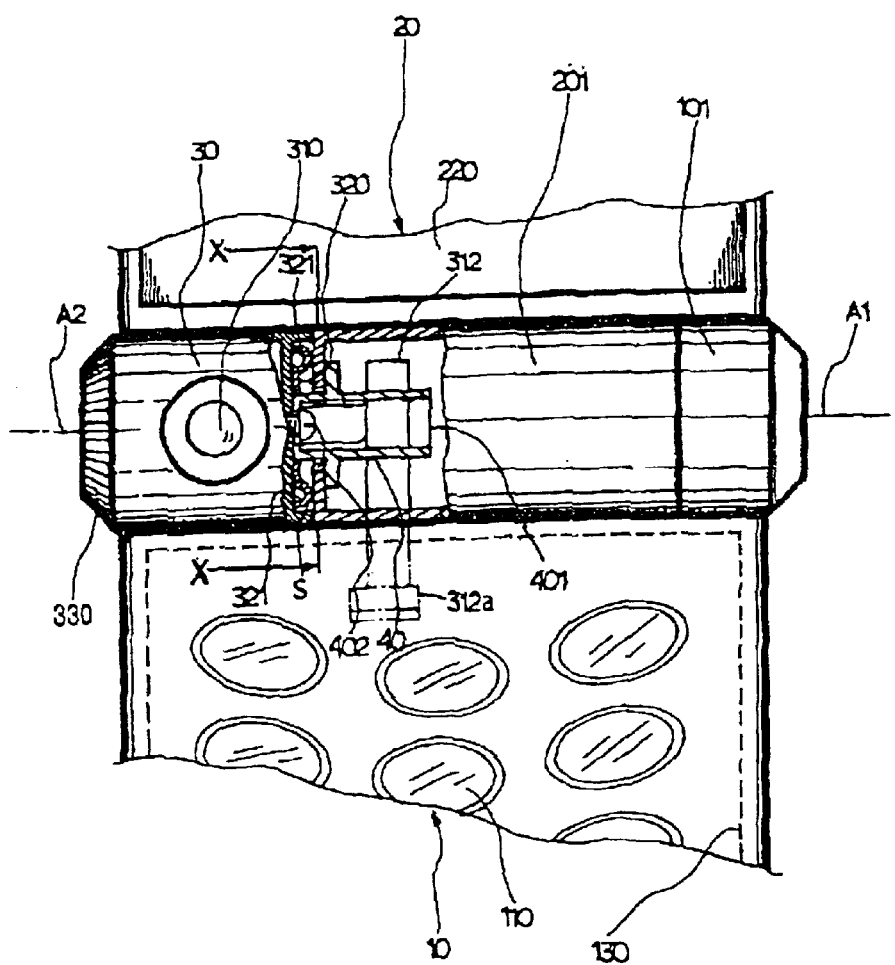
FIG. 3 is an enlarged partial sectional view of the lens housing mounting apparatus of the folder-type telephone according to one embodiment.
Figure 4:
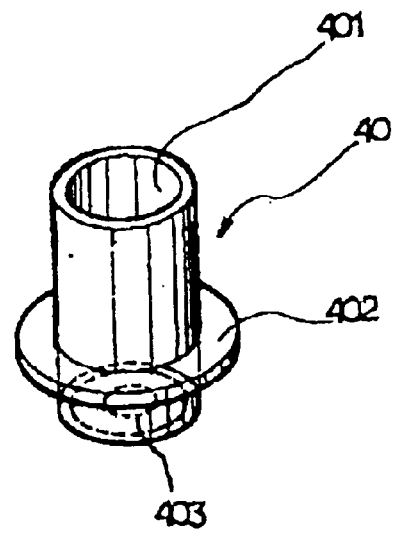
FIG. 4 is a perspective view showing a connector of the folder-type telephone according to one embodiment of the present invention.

As shown in FIGS. 3 and 4, the connector 40 which connects the lens housing 30 to the second side hinge arm 102 further includes a locking member 402 to confine the connected lens housing 30 to the second side hinge arm 102. As shown, a first end of the connector 40 is an opened end 401, and a second end of the connector 40 is a partially opened end 403.

When the connector 40 is mounted using the latch means S, as shown in FIG. 3, the opened end 401 of the connector 40 faces the second side hinge arm 102 and the partially opened end 403 faces the lens housing 30. The latch means S may be implemented using a screw or similar hardware. The locking member 402, is shown as a ring extending axially from the connector 40, and is confined to one end of the second side hinge arm 102. The locking member 402 confines the lens housing 30 to the second side hinge arm 102 using the latch means S.

As illustrated in FIG. 3, the elastic substance 320, which can be constructed from metal plate or thin-type metal, includes a protruding tension member 321 along an outer circumferential direction. The tension member 321 is provided to rotate the lens housing 30 and to connect the lens housing 30 to the second side hinge arm 102. The protruding portion of the elastic substance 320 contacts the second side hinge arm 102. The outer circumferential end of the elastic substance 320 contacts the bottom of the recess 314.

The mounting structure of the FPCB 312 of the camera lens assembly will now be described with reference to FIGS. 1 and 5. As shown in FIG. 5, the camera lens assembly includes the camera lens 310, a charge coupled device (CCD) (not shown) mounted below the camera lens 310, and the FPCB 312 contacting the CCD. The camera lens assembly must be electrically connected to a main printed circuit board (PCB) 130 mounted on the body housing 10. The electrical connection between the main printed circuit board and the FPCB 312 is made via a slim-type connector 312a as a terminating component of the FPCB 312. The additional FPCB mounting structure for preventing the FPCB 312 from being twisted is required because the lens housing 30 rotates.

Figure 6:
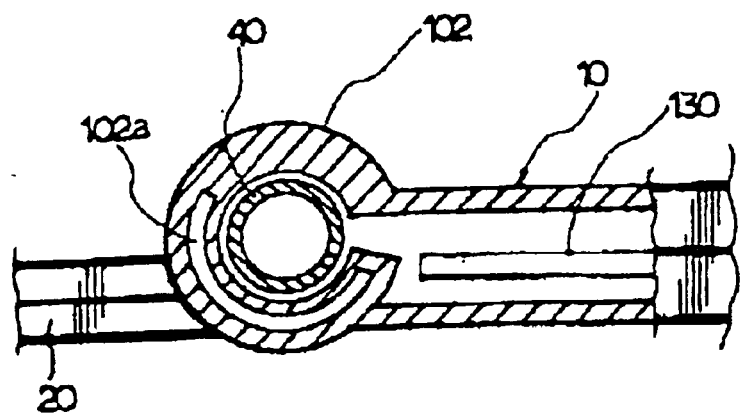
FIG. 6 is a transverse sectional view taken along the line X—X of FIG. 3.
Figure 7:
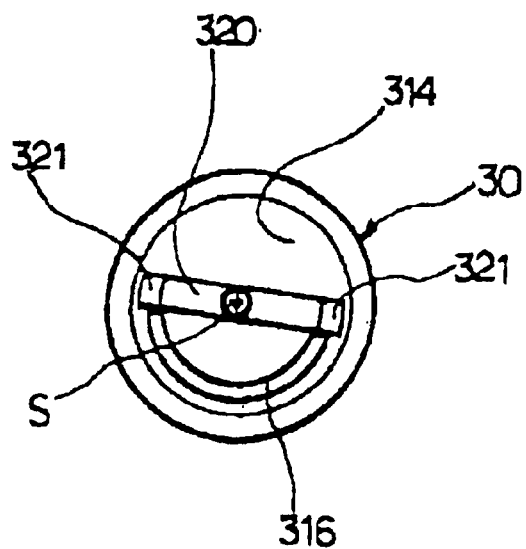
FIG. 7 is a perspective view illustrating an elasticity mounted in the lens housing according to the present invention.

As mentioned above, and referring to FIG. 6, the surfaces of the recess 314 of the lens housing and the second side hinge housing 102, which face each other, include a first opening 316 and a second opening 102a, respectively. The FPCB 312 which protrudes from the lens housing 30 sequentially passes through the first opening 316 and the second opening 102a, and is wound at least one time along the outer circumference of the connector 40, and faces the main PCB 130 of the body housing. That is, while the lens housing 30 is being rotated relative to the fixed body housing 10, the FPCB 312 is put along the lens housing 30 and the body housing 10 move over FPCB 312. Therefore, the FPCB 312 is connected to the main PCB 130 after at least once winding the connector 40. Accordingly, it is possible to prevent the FPCB 312 from being twisted.

Furthermore, the connector 40 is cylindrical so that the FPCB 312 is easily wound at least once. Alternatively, the FPCB 312 can be wound at least twice along the circumference of the connector 40.

In sum, because the rotational lens housing according to the present invention is rotatably mounted in the folder-type telephone, a user can perform video functions with comfort and ease. Further, even though the lens housing rotates, the novel construction prevents the printed circuit board (FPCB) from being twisted.

While the invention has been shown and described with reference to a certain preferred embodiment thereof, it will be understood by those skilled in the art that various changes in form and details may be made therein without departing from the spirit and scope of the invention as defined by the appended claims. For example, the present invention needs not be restricted to folder-type telephones but can be applied to all folder-type communication apparatus.

What is claimed is:

1. An apparatus for mounting a camera lens housing of a telephone including a body housing, a folder, and a hinge means for rotatably connecting the body housing to the folder, the apparatus comprising:
    a hinge arm arranged in a direction of one side hinge axis of the body housing;
    a lens housing with a camera lens assembly;
    a connector, around which a flexible printed circuit board (FPCB) of the camera lens assembly is wound at least once and through which the FPCB passes so that the FPCB of the camera lens assembly is connected to a main printed circuit board (PCB), the connector for rotatably confining the lens housing to the hinge arm within a predetermined angle; and
    a latch means for confining the lens housing and the connector in a direction of a hinge axis.

2. The apparatus of claim 1, further comprising an elastic substance in the direction of the hinge axis between the lens housing and the connector.

3. The apparatus of claim 2, wherein the elastic substance comprises a tension member along a circumferential direction.

4. The apparatus of claim 3, wherein the lens housing supports an outer circumferential end of the elastic substance and the tension member is supported to contact the hinge arm.

5. The apparatus of claim 1, wherein the lens housing comprises a recess on a surface facing the side hinge arm.

6. The apparatus of claim 1, wherein the connector comprises a locking member extended to a circumferential direction and the locking member is confined to the hinge arm.

7. The apparatus of claim 1, wherein one end of the connector is an opened end and the other end of the connector is a partially opened end.

8. The apparatus of claim 1, wherein the hinge arm comprises a first opening in order to electrically connect the FPCB ejected from the camera lens assembly to the main PCB of a main body.

9. The apparatus of claim 8, wherein the first opening is extended in an outer circumferential direction.

10. The apparatus of claim 1, wherein the connector is cylindrical and is extended to the direction of the hinge axis.

11. The apparatus of claim 1, wherein the FPCB ejected from the camera lens assembly winds the outer circumference of the connector at least once and has its free end contact the main PCB.

12. A folder-type telephone, comprising:
    a body housing integrated with first and second side hinge arms arranged to be separated from each other;
    a folder integrated with a center hinge arm arranged between the first and second side hinge arms;
    a rotational lens housing provided to face the second side hinge arm;
    a connector, around which a flexible printed circuit board (FPCB) ejected from the lens housing is wound at least once and through which the FPCB passes so that the FPCB is connected to a main printed circuit board (PCB), and having a locking member extended in an outer circumferential direction, the locking member for confining the lens housing to the second side hinge arm, the connector for rotatably confining the rotational lens housing to the second side hinge arm within a predetermined angle;

first and second openings extended to the lens housing and the second side hinge arm along outer circumferential directions so that the FPCB passes through the first and second openings; and a latch means for confining the lens housing and the connector in a direction of a hinge axis.

13. The folder-type telephone of claim 12, further comprising an elastic substance between the lens housing and the connector in the direction of the hinge axis.

14. The folder-type telephone of claim 13, wherein the elastic substance further comprises a tension member along a circumferential direction.

15. The folder-type telephone of claim 14, wherein the tension member is supported so as to contact the second side hinge arm.

* * * * *